Dec. 18, 1934. L. WERNER Re. 19,404

HAIR DRYING APPARATUS

Original Filed July 8, 1931 2 Sheets-Sheet 1

Inventor:
Ludwig Werner

Dec. 18, 1934. L. WERNER Re. 19,404
HAIR DRYING APPARATUS
Original Filed July 8, 1931 2 Sheets-Sheet 2
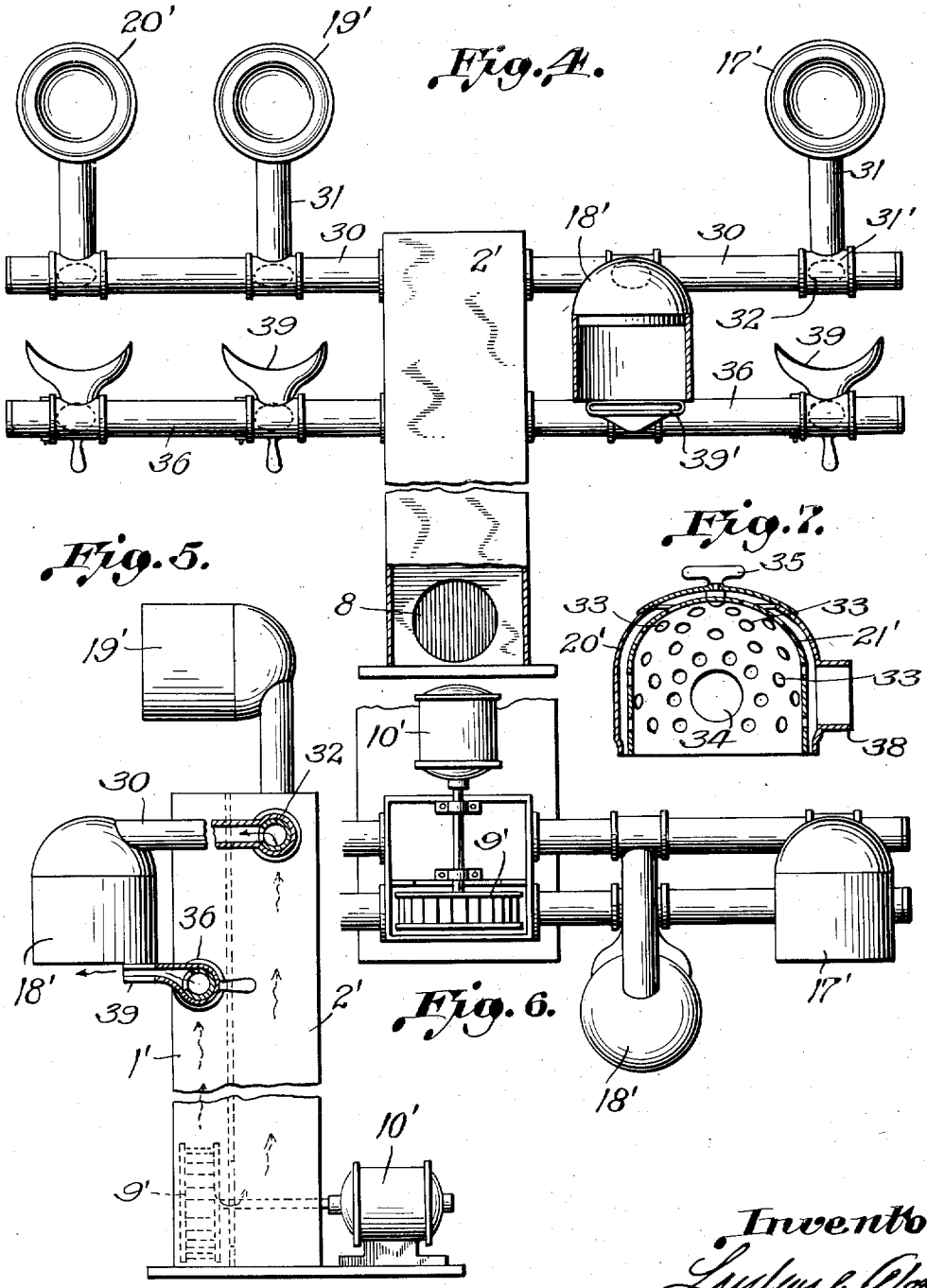
Inventor:
Ludwig Werner Reissued Dec. 18, 1934

Re. 19,404

UNITED STATES PATENT OFFICE 19,404

HAIR DRYING APPARATUS

Ludwig Werner, Brooklyn, N. Y., assignor to Eastern Laboratories Incorporated, New York, N. Y., a corporation of New York Original No. 1,966,084, dated July 10, 1934, Serial No. 549,366, July 8, 1931. Application for reissue November 7, 1934, Serial No. 751,915

3 Claims. (Cl. 34—26)

This invention relates to apparatus for the rapid drying of the hair in beauty and tonsorial parlours. Most of the hair drying machines now on the market are of the individual, electrically heated type. The expense of operating such dryers, however, in large shops becomes excessive, both on account of the heavy cost of the electric current used in the heating elements and also the cost of installing and maintaining in repair a large number of machines. By my invention I have devised a compact heating unit, preferably heated by gas, and which may supply a number of hoods or head-drying caps. By providing a flue creating natural up draft, my unit may be employed either with or without a blower. Preferably a plurality of flues are employed having different degrees of heat with a single blower-motor for both.

My invention also contemplates an improvement in hair drying caps or hoods, whereby the hot air is uniformly distributed about the head and not discharged directly against the scalp in hot localized jets which cause the subject unnecessary discomfort if not actually burning the skin or scorching the hair.

Referring to the drawings,

Fig. 4 is a front elevation, partly in section, of of a modified form of hair-drying machine.

Fig. 5 is a side elevation of the same.

Fig. 6 is a top view of the same with the top or cover removed.

Fig. 7 is a vertical section of a modified form of hood or hair drying dome which may be used with either form of the invention.

Figure 1:
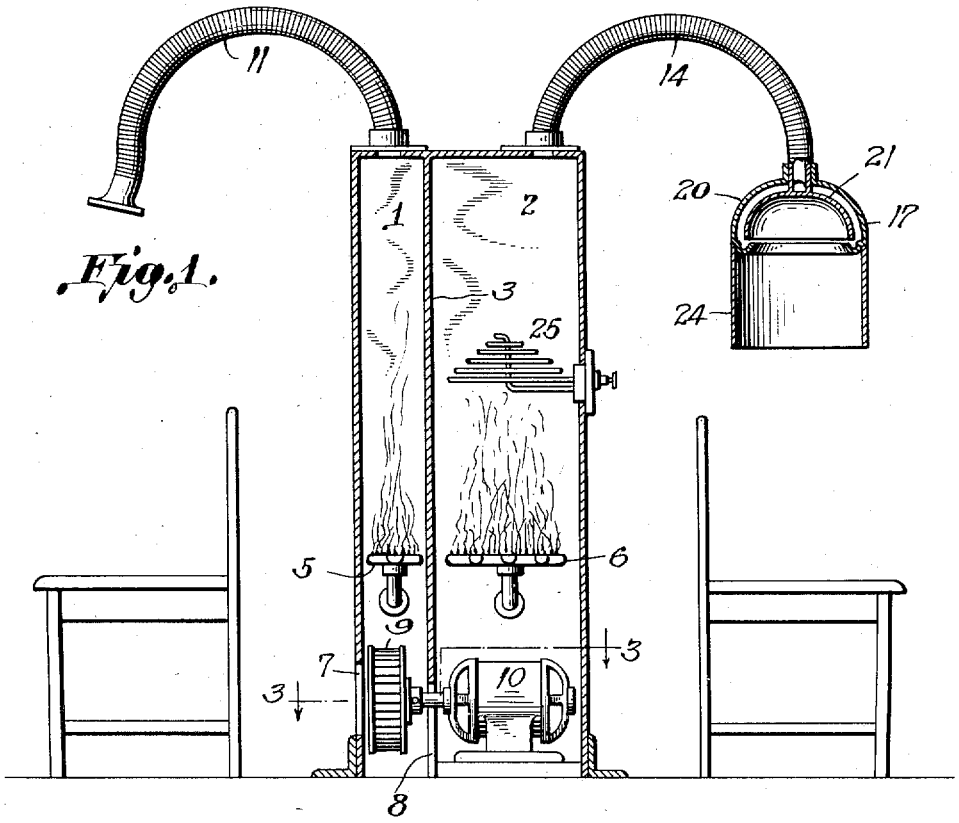
Figure 1 is a vertical section through a preferred form of heater unit.
Figure 2:
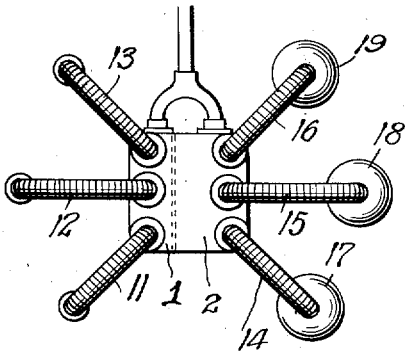
Fig. 2 is a plan view of the same.
Figure 3:
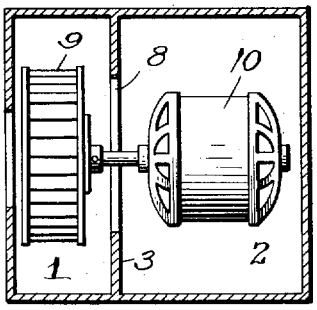
Fig. 3 is a transverse sectional view through the shell of the unit taken on line 3—3 of Fig. 1.

My heater unit preferably comprises one or more vertical flues 1 and 2 formed of sheet metal. As shown, a rectangularly shaped box-like member is divided into two flues by a separating wall 3 extending preferably to one side of the middle so that the flues are of different transverse area. In each flue and preferably in the lower part thereof, I place a source of heat such as a gas burner 5—6. Since the bottoms of the flues are open at 7 and 8, a natural draft is created which will cause a flow of warm air up the flues and out of the air tubes even without a blower.

I prefer, however, to provide a power blower 9 to obtain larger flow of air at temperatures which will not burn the subject. Blower 9 is shown as of the centrifugal type and is shown as located adjacent aperture 7 so as to draw outside air into its center and discharge it centrifugally. The major portion of the air will hence be forced up flue 1 past the intense flame 5. By closing the blower at the back, the remainder of the air will flow through aperture 8 as indicated by the arrows and through the driving motor 10 located at the base of the major flue and thence up this flue past flame 6.

Since flue 1 has the more rapid air flow at high temperatures, I connect thereto a plurality of flexible pipes 11, 12 and 13 which may be used to direct the air stream in the hand of the operator. On the flexible pipes 14, 15 and 16 connected to flue 2, on the other hand, I provide hair covering dry domes 17, 18 and 19 of improved design. Both supplies may obviously be directed on the same subject if desired to vary the temperature to suit individual cases and the temperature of supply varied. Each dome preferably comprises an outer dome or cover 20 and an inner dome-shaped part 21, thereby providing a space between the domes which is in communication with the interior of tube 14. Adjacent its lower end, outer member 20 may be beaded or spun inwardly to form a reduced part 23 over which is slipped a sheet metal hood 24. Preferably also the lower end is turned inwardly so that the down-coming air is deflected upwardly to swirl around the interior of dome 21 so that the air will be uniformly distributed and not come into contact with the scalp ununiformly or in localized jets. If desired an electric heating element 25 may be employed in addition to or instead of the gas burner 6.

By having the housing 1 for blower 9 of square or rectangular cross section and making it of ample proportions, it can accommodate different size blowers and motors, so that if the buyer finds he needs more hot air he can install a bigger fan and motor in his present dryer without getting an entire new machine. The rectangular or square shaped housing for the centrifugal blower 9 also has the advantage of giving a larger supply of air than the ordinary round or convolute shaped blower casing, although at a lower pressure. This is due in part to the fact that the blower is much nearer the side walls of the casing along its horizontal and vertical diameters than it is at the corners, thus producing several more or less distinct currents of air and not building up a single current under high pressure. I have found that my blower with its three points of maximum centrifugal pressure produces on the order of 50% more cubic feet of air than the ordinary circular or convolute constructions.

Figs. 4 to 6 show one of the many different forms my invention may assume. According to this modification a horizontal pipe 30 extends from each side of main flue 2′ and to each pipe are connected a plurality of drying domes 17′, 18′, 19′, 20′, etc. The domes in this instance are each mounted on pipes 31 rotatably mounted on the pipe 30 so that when not in use they may be swung upwardly as at 17′, 19′ and 20′. When it is desired to use one, however, it is swung downwardly as at 18′. Preferably the opening 32 in the inside pipe 30 at each dome or hood only aligns with the corresponding opening in the sleeve 31′ of pipe 31 when the dome is swung into operative position, so that when the hoods are raised, no air is blown out the raised hoods but when the hood is lowered the ports are opened to pass hot air through pipe 31 and the hood 18. By placing the hoods in intermediate positions the amount of air passing therethrough may be regulated at will. Also the volume of air emitted may be varied since more air will emerge when the apertures 34′ and the pipe 38′ are in line.

A somewhat different form of hood is also shown (see Fig. 7). In this instance the inner dome 21′ is perforated at 33. It is also provided with an extra large opening 34 and the dome 21′ made rotatable as by thumb piece 35, so that aperture 34 may either be turned away from the entrance pipe 38 (Fig. 7) or in line with the same. The former position is for ordinary drying operations, but the latter position is especially effective for drying the heavy black hair characteristic of the present styles of hair bobbing, because it directs the main volume of air directly on this part of the hair. By this means also the main volume of air emerging through opening 34 may be directed against any desired portion of the hair.

In this case also, provision is made for preventing the parlor from becoming overheated. An outlet nozzle 39 is provided near each dome in its lower position. Such outlet is shown as a slotted crescent shaped member adapted to be placed around the back of the subject's neck. It may be pivotally mounted on an intake pipe 36. When turned up, ports 37 are closed as with the hoods, but when turned down as at 39′, the ports are opened.

From the foregoing, the operation and advantages of my invention will be readily apparent. With my hair drying arrangement a number of heads may be treated at once and at an expense for heat less than that employed for drying one head with the ordinary electrically heated dryer at the prevalent rates for electricity and gas. If only a few customers are present, only one burner need be lighted and only one motor blower is employed for all the drying units, thus greatly reducing the initial expense of the apparatus.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A hair drying machine for beauty parlors comprising a plurality of adjacent flues of different sizes, a burner in each flue in the lower part thereof the smaller flue being the hotter, a motor driven blower under said burners and adapted to supply forced draft for each flue, the motor being in the larger, cooler flue and the blower in the smaller, hotter flue, there being an opening between the flues adjacent the bottom of the blower whereby the air from the upper portion of the blower passes directly up the hot flue and the air from the lower part passes into the cooler flue and through the motor.

2. A hair drying machine for beauty parlors comprising two vertical flues side by side, a centrifugal fan in one flue and a motor for driving the fan in the other flue, an opening from the exterior into the flue containing the fan to admit air to the fan, and an opening between the two flues adjacent the fan and the motor, the side of said centrifugal fan facing the said second mentioned opening being closed by an imperforate disc, so that said centrifugal fan delivers air to both flues, means in each flue for heating the air therein, and means for regulating the heating means so that cool air may be delivered from one flue and hot air from the other flue.

3. A hair drying machine for beauty parlors comprising two vertical flues side by side, a centrifugal fan in one flue and a motor for driving the fan in the other flue, an opening from the exterior into the flue containing the fan to admit air to the fan, and an opening between the two flues adjacent the fan and the motor, the side of said centrifugal fan facing the said second mentioned opening being closed by an imperforate disc, so that said centrifugal fan delivers air to both flues, means in each flue for heating the air therein, means for regulating the heating means so that cool air may be delivered from one flue and hot air from the other flue, and means communicating with said flues to direct the air from said flues against the hair of a person.

LUDWIG WERNER.